United States Patent
Bauer et al.

(10) Patent No.: US 8,376,302 B2
(45) Date of Patent: Feb. 19, 2013

(54) ATTACHING MODULES TO A MEDICAL SUPPLY UNIT

(75) Inventors: Georg Bauer, Schwabhausen (DE); Juergen Brunner, Berg (DE); Eberhard Holz, Tuebingen (DE); Thomas Weisheit, Munich (DE)

(73) Assignee: Trumpf Medizin Systeme GmbH + Co. KG, Saalfeld (DE)

( * ) Notice: Subject to any disclaimer, the term of this patent is extended or adjusted under 35 U.S.C. 154(b) by 316 days.

(21) Appl. No.: 12/775,672

(22) Filed: May 7, 2010

(65) Prior Publication Data

US 2010/0284731 A1 Nov. 11, 2010

(30) Foreign Application Priority Data

May 7, 2009 (EP) .................................... 09159613

(51) Int. Cl.
A47H 1/10 (2006.01)
(52) U.S. Cl. ........................................ 248/317
(58) Field of Classification Search .................. 248/343, 248/317, 142, 682, 688
See application file for complete search history.

(56) References Cited

U.S. PATENT DOCUMENTS

| | | | |
|---|---|---|---|
| 4,048,768 A | 9/1977 | Good | |
| 5,023,396 A * | 6/1991 | Bartee et al. .................. | 174/486 |
| 5,165,640 A | 11/1992 | Williams | |
| 5,348,485 A | 9/1994 | Briechle et al. | |
| 5,625,537 A | 4/1997 | Neuder | |
| 5,907,126 A * | 5/1999 | Cancellieri et al. ............. | 174/54 |
| 5,975,318 A | 11/1999 | Jay | |
| 6,056,561 A | 5/2000 | Lin | |
| 6,070,841 A | 6/2000 | Robinson | |
| 6,196,649 B1 * | 3/2001 | Block et al. .................... | 312/209 |
| 6,230,910 B1 | 5/2001 | Olsson et al. | |
| 6,397,886 B1 | 6/2002 | Schopferer | |
| 7,410,379 B1 * | 8/2008 | Byrne ........................... | 439/215 |
| 8,017,865 B1 * | 9/2011 | Baldwin ........................ | 174/66 |
| 2004/0026589 A1 | 2/2004 | Kreuzer et al. | |
| 2008/0074015 A1 * | 3/2008 | Parshad et al. ................ | 312/198 |
| 2009/0201632 A1 | 8/2009 | Bauer et al. | |
| 2009/0236482 A1 | 9/2009 | Winig et al. | |

FOREIGN PATENT DOCUMENTS

| | | |
|---|---|---|
| DE | 4239625 C1 | 8/1993 |
| DE | 29505072 U1 | 9/1996 |
| DE | 29617895 U1 | 2/1997 |
| DE | 19715156 C1 | 8/1998 |
| EP | 0401556 A1 | 12/1990 |
| EP | 0837535 A2 | 2/1998 |
| EP | 2058911 A1 | 11/2008 |
| FR | 2614736 | 11/1988 |
| WO | 0005530 A1 | 2/2000 |

* cited by examiner

*Primary Examiner* — Ramon Ramirez
(74) *Attorney, Agent, or Firm* — Fish & Richardson P.C.

(57) ABSTRACT

A medical supply unit including a carrier with longitudinal edges and longitudinal faces is provided such that the longitudinal faces are provided with openings at the faces of which resilient fastener elements are provided. These resilient fastener elements engage in built-in modules forming a part of one of the longitudinal faces in order to form a positive connection with the built-in modules.

20 Claims, 5 Drawing Sheets

ATTACHING MODULES TO A MEDICAL SUPPLY UNIT

CROSS REFERENCE TO RELATED APPLICATION

This application claims priority under 35 U.S.C. §119(a) to European Application No. 09 159 613.0, filed on May 7, 2009, the entire contents of which are hereby incorporated by reference.

TECHNICAL FIELD

The invention relates to a medical supply unit with built-in modules. In particular, the invention relates to a medical supply unit with built-in modules which are mountable without any tool and which are mountable at arbitrary positions in a predetermined grid.

BACKGROUND

In the medical field, in particular, in intensive-care medicine or in surgery, it is often necessary to operate a plurality of electrical and electronic medical apparatuses together in a spatial area and to arrange them such that they are located close to the patient but do not hinder access to the patient. Normally, this requires a certain mobility of these apparatuses as well as a flexibility of the attachment options at a medical supply unit.

In view of hygienic requirements, it is desirable to keep the lines between the connectors at the medical supply unit and the medical apparatuses as short as possible. Thus, it is desirable that the data connection points and the outlets, namely electrical outlets or gas outlets, be located close to the respective apparatuses to configure the lengths of the lines as short as possible. When the configuration or the positioning of the medical apparatuses is changed, it is therefore favorable to arrange the outlets such that they are spatially advantageously arranged, namely in a short distance to the medical apparatuses.

Due to hygienic reasons, it is also desirable that fasteners, such as screws, not be visible from the outside, as this would affect the ability to clean, and because additional gaps and openings would be created, in which the pathogens may adhere.

For an efficient assembly of the medical supply units, it is desirable to employ modules that are as standardized as possible and that can be mounted in the medical supply unit without any tool. However, the dismantling of the modules must only be enabled by means of tools.

From the prior art, medical supply units such as ceiling mounted supply units comprising one or multiple carriers for outlets are known, which comprise a skeletal structure consisting of profiles whereby data connection points or outlets for medical gases and electrical current are fixed in the skeletal structure by special holding sheets. Then, the base bodies of the outlets are covered by means of cover plates produced for the specific configuration of the outlets. Normally, these plates are fixed at the skeletal structure by means of screws.

However, the configuration and the arrangement of the outlets are typically fixedly set. A subsequent change of the position of outlets or the addition or omission of outlets requires producing a new cover plate. Thus, subsequent modifications involve a significant effort. Also, it is typically not possible to optimally organize the assembly because prefabricated modules typically cannot be inserted into the carrier of the medical supply unit. Rather, the individual parts have to be successively inserted into the carrier, which typically involves elaborate working steps because the assemblies and elements have to be individually screwed into the carrier.

SUMMARY

In one aspect, a medical supply unit is provided which enables the insertion of modular prefabricated assemblies in a simple manner into the medical supply unit and which allows a large flexibility in arranging the assemblies.

According to an aspect of the invention, the medical supply unit comprises a carrier with at least three longitudinal edges, at least three longitudinal faces and an internal space. At least one of the longitudinal faces is provided with an opening, and a resilient fastener element protruding in the direction of the opening is provided on at least two faces of the opening.

DETAILED DESCRIPTION

Figure 1:
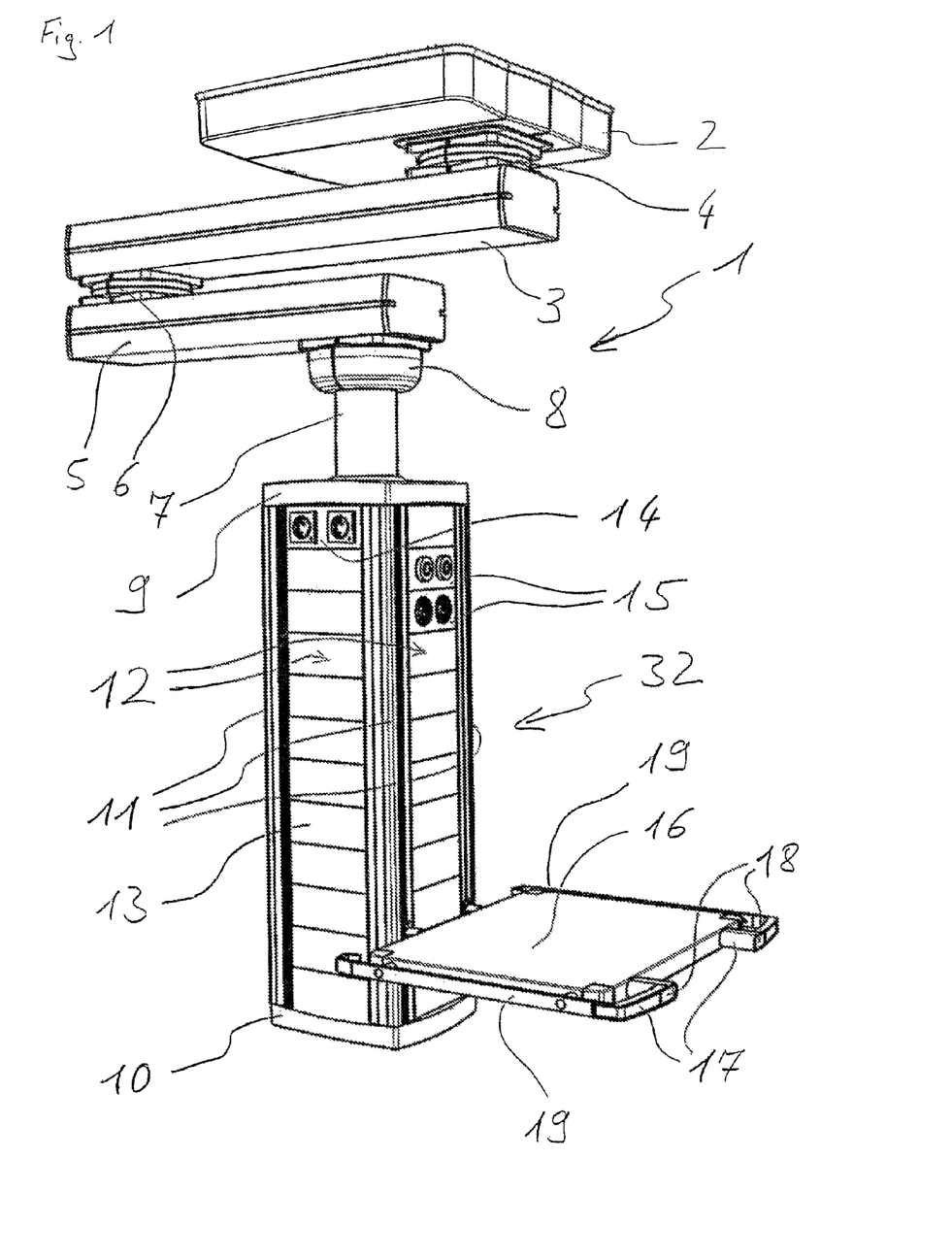
FIG. 1 is an isometric view of an embodiment of the medical supply unit configured as a ceiling mounted support system.

FIG. 1 shows an isometric view of a medical supply unit 1. The medical supply unit 1 comprises a ceiling mount that is covered by a ceiling cover plate 2. An upper support arm 3 is connected at one end in longitudinal direction at the upper face to the ceiling mount by means of an upper revolving joint 4. At its opposite end in longitudinal direction at its lower face, the upper support arm 3 is connected to a lower support arm 5 by means of a medial revolving joint 6. The medial revolving joint 6 is arranged at one end of the lower support arm 5 in longitudinal direction. At the end of the lower support arm, which is opposite to the medial revolving joint 6 in the longitudinal direction, a lower revolving joint 8 is arranged which in turn is connected to a distance column 7. At the lower end of the distance column 7, an upper cover plate 9 is fixed. The upper cover plate 9, a lower cover plate 10, and intermediate elements constitute a carrier 32.

In this embodiment, the carrier 32 has a cuboid shape and includes four longitudinal edges 11 and four intermediate longitudinal faces 12. In alternative embodiments, carriers having three, five, or more longitudinal edges and longitudinal faces are possible, too. In such cases, the principle shape is cylindrical with an appropriate cross-section. In other embodiments, medical supply units may also be provided with multiple carriers.

A part of the longitudinal faces 12 is formed by built-in modules 13. The built-in modules 13 are arranged one above the other such that they form a continuous face almost without gaps, which extends from the upper cover plate 9 to the lower cover plate 10. The built-in modules 3 are provided at the four faces of the carrier 32. The built-in modules 13 are designed as pure cover modules without fixtures, electrical built-in modules 14 having inserted electrical outlets for supplying the medical apparatuses with current, or gas built-in modules 15 having gas outlets or pressure gauges for supplying the medical apparatuses with gas.

At the right-hand face of the carrier 32 shown in FIG. 1, a platform 16 is arranged for supporting or for fastening medical apparatuses or instruments. The platform 16 is equipped with operating handles 17 in which operating elements 18 are provided. The operating elements 18 serve for driving actuators of the medical supply unit such as controllable brakes in the revolving joints 4, 6 and 8. The rails 19 extend at the sides of the platform 16 and serve for receiving additional medical apparatuses or accessories.

Figure 2:
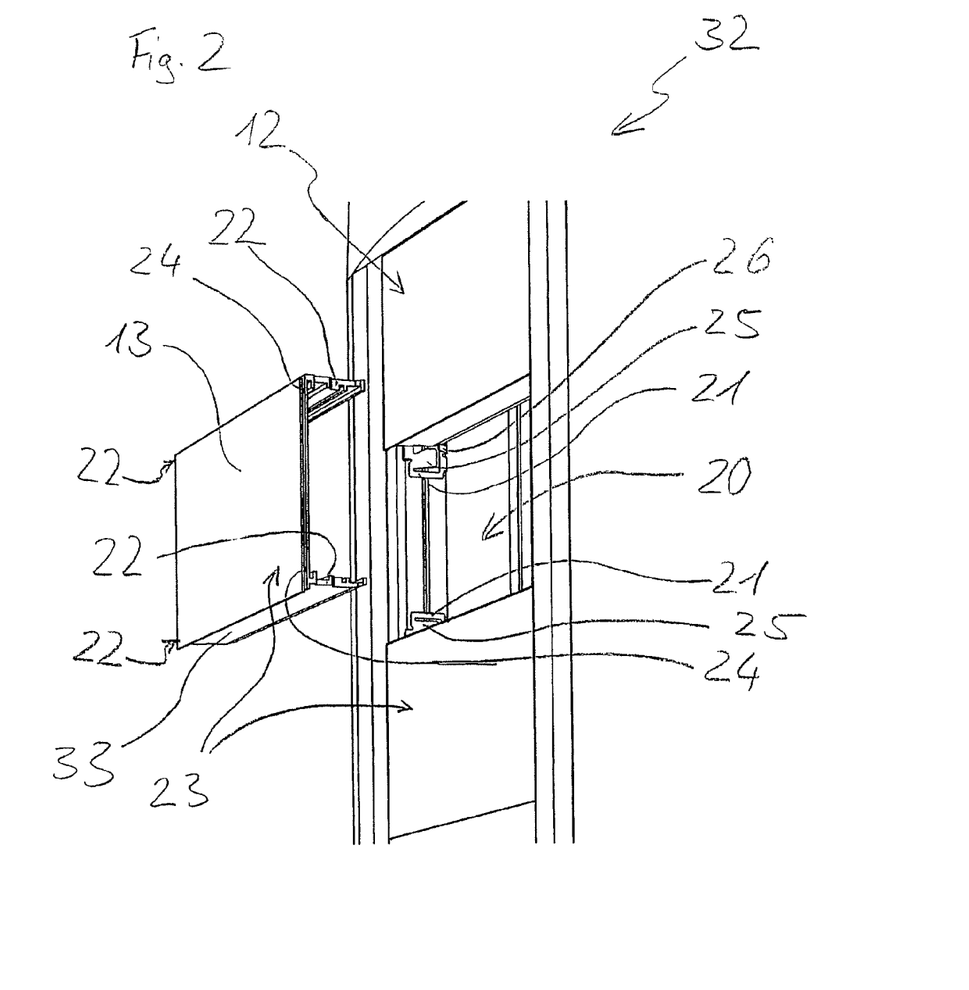
FIG. 2 shows an isometric view onto a longitudinal face of the carrier with a built-in module removed.

In FIG. 2, a longitudinal face 12 of the carrier 32 of the medical supply unit is illustrated in an isometric view whereby the built-in module 13 is shown in a non-inserted condition. The carrier 32 comprises an opening 20 in its longitudinal face 12. At both faces of the opening 20, resilient fastener elements 21 which are connectable to the carrier 32 are provided. In the present embodiment, two resilient fastener elements 21 are provided for each built-in module 13. In other embodiments, however, only one resilient fastener element 21 is provided beside the built-in module 13. Additionally or alternatively, fastener elements may be provided at the upper face or lower face of the built-in module 13.

The resilient fastener elements 21 are separate elements in this embodiment. Alternatively, the profiles of the carrier 32 may be formed such that the resilient fastener elements 21 are integrated therein. The resilient fastener elements each include a resilient portion 25. One is shown at the upper fastener element 21 and one is shown at the lower fastener element 21 within the opening 20. To enlarge the holding force, multiple resilient portions 25 may alternatively be provided. Furthermore, the resilient fastener element 21 comprises a non-resilient portion 26. The non-resilient portion 26 serves as a vertical guide for the mounting of the built-in modules 13. Multiple non-resilient portions 26 may be provided. The resilient fastener element 21 is made of spring steel in this embodiment, however, any other suitable materials may be used.

The built-in module 13 comprises a front face 23 which forms a part of the longitudinal face 12 in the assembled condition, together with the front faces 23 of the additional built-in modules 13. A protruding element 33 is provided at the upper face and at the lower face of the built-in module 13, opposite the front face 23. Faces 22 of protruding elements 33 are configured to fasten the built-in modules 13 as described below. The front face 23 is formed with a recessed shoulder on each lateral end, in which two openings 24 are provided at both ends. The openings 24 are suitable for allowing a specific tool to penetrate the openings, in the assembled condition, towards the resilient fastener elements 21 to release the built-in modules 13. In other embodiments, only one opening or multiple openings are possible, too.

Figure 3:
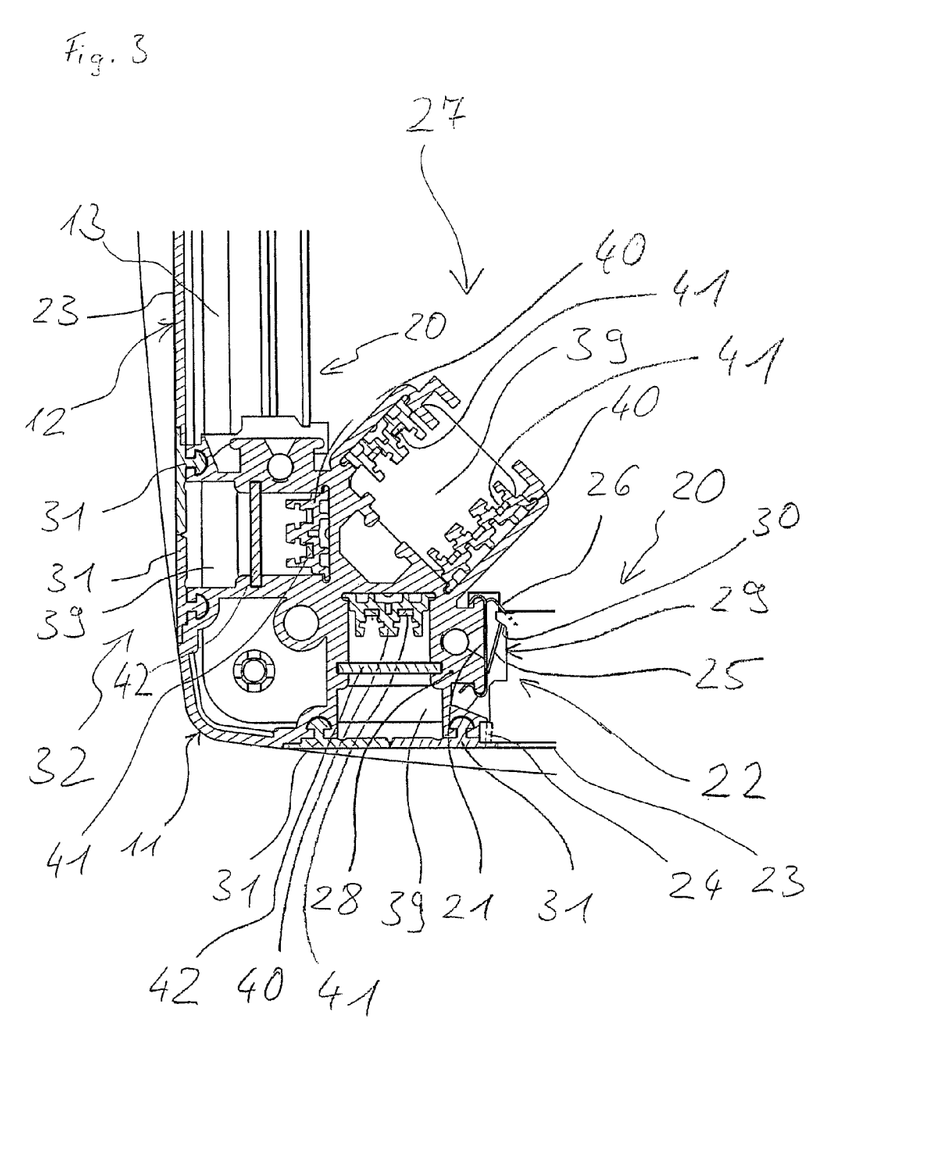
FIG. 3 is a horizontal section through a region of the carrier.

A horizontal section through a region of the carrier 32 is shown in FIG. 3. In this illustration, two longitudinal faces 12 formed by a portion of a profile 28, covering devices 31 and the front faces 23 of the built-in modules 13 are adjacently arranged to the longitudinal edge 11. An internal space 27 is formed by the profiles 28 and the built-in modules 13.

The profile 28 comprises three hollow rails 39 each including isolating rails 40 with conductor rails 41. Fixing rails 42 are additionally inserted into the outer hollow rails 39. The hollow rails 39 are covered by the covering devices 31 due to hygienic reasons to avoid ingress of liquids into the hollow rails 39. The conductor rails 41 in the hollow rails 39 directed toward the outside serve for transmitting control signals for the operation of the medical supply unit 1 and, if necessary, for driving medical apparatuses provided thereon. The conductor rails directed toward the internal space 27 serve, on one hand, for data transmission for operating the medical supply unit, and, on the other hand, for supplying electrical outlets or further electrical devices of the medical supply unit 1.

Figure 3A:
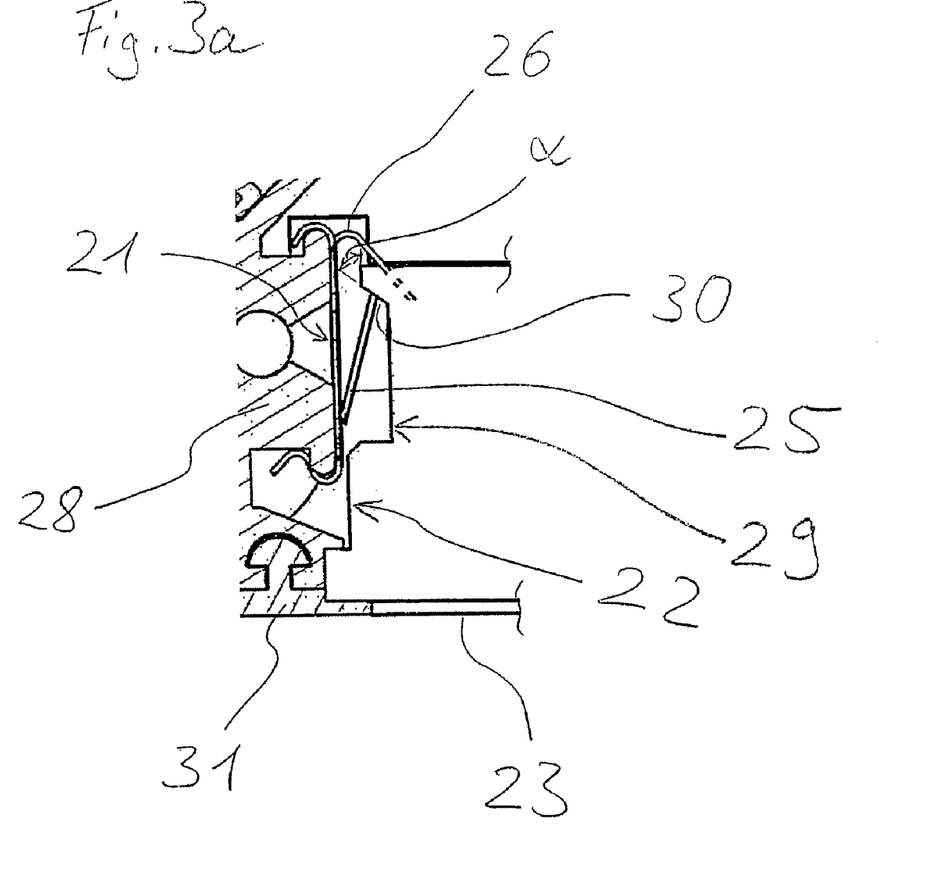
FIG. 3a shows a magnified detail view of the region of the carrier of FIG. 3 with the clip connection engaged with the built-in module.

In FIG. 3a, it is shown in detail how the profile 28 in two regions which are faced toward the built-in modules 13, respectively comprises a shape having two opposite ribs which can be used in such way that the resilient fastener element 21 can be snapped on. By this configuration, a positive lock is created in the horizontal direction and a frictional connection is created in the vertical direction whereby the resilient fastener element 21 can be mounted in each arbitrary height. However, in an alternative embodiment, the profile 28 may also be designed in such a way that a positive locking also exists in the vertical direction.

As illustrated in FIG. 3 and FIG. 3a from above, the built-in module 13 has a certain contour. The faces 22 of the built-in module 13 are designed such that along their extension towards the internal space 27, a recess 29 is arranged in one region. The recess 29 comprises a locking face 30 at the face which is more distant from the front face 23. The locking face 30 is formed such that it encloses an angle $\alpha$ with the face 22, which is smaller than 90°. In an alternative embodiment, instead of a recess 29, an opening which also comprises a locking face 30, as described above, may be provided.

Starting from the profile 28, the non-resilient portion 26 of the resilient fastener element 21 protrudes towards the opening 20 which is closed by the built-in module 13. When a built-in module 13 is mounted, the non-resilient portion 26 intersects with the contour of the built-in module 13. By a suitable vertical positioning the resilient fastener elements 21, the non-resilient portion 26 serves as a guide in the vertical direction for the built-in elements 13 because the built-in elements 13 lie on the non-resilient portion 26.

During assembly of the built-in elements 13, the resilient portion 25 of the resilient fastener element 21 is pushed back by the contour of the built-in element 13. When the built-in element 13 is further inserted, the resilient portion 25 of the resilient fastener element 21 comes into a positive engagement with the built-in element 13. The resilient portion 25 engages with its front face into the recess 29 at the locking face 30, and thereby locks the built-in module 13 when springing back during the assembly procedure of the built-in module 13. The length of the resilient portion 25 is designed such that the point of contact between the resilient portion 25 and the locking face 30 is roughly arranged in the center of the locking face 30. Thus, when shape tolerances and position tolerances of the profile 28 of the resilient fastener element 21 and the built-in module 13 occur, a back-lash free assembly of the built-in elements 13 can be ensured. The angle $\alpha$ and the distance between the locking face 30 and the front face 23 is chosen such that the resilient portion 25 always engages with the locking face 30 even at maximum or minimum values in the sum of tolerances.

The openings 24 are arranged such that after removal of the covering device 31 or pushing away the covering device 31, an access is enabled for a specific tool with which the resilient portion 25 can be pushed in the direction of the profile 28. Thereby, the engagement of the resilient portion 25 and the locking face 30 is terminated and the built-in module 13 is unlocked and it can be pulled out of the carrier 32. Favorably, the tool is designed as to push back the resilient portion 25 when pushed in toward the internal space 27 and as to automatically pull the built-in module 13 out of the opening 20 when the tool is pulled back. The mere pushing back of the resilient portion 25 without the automatic pulling out may take place by means of a conventional tool such as a screw driver or a pin.

After the insertion of the built-in modules 13, the openings 24 are covered by the covering devices 31 to improve the hygienic conditions.

Figure 4:
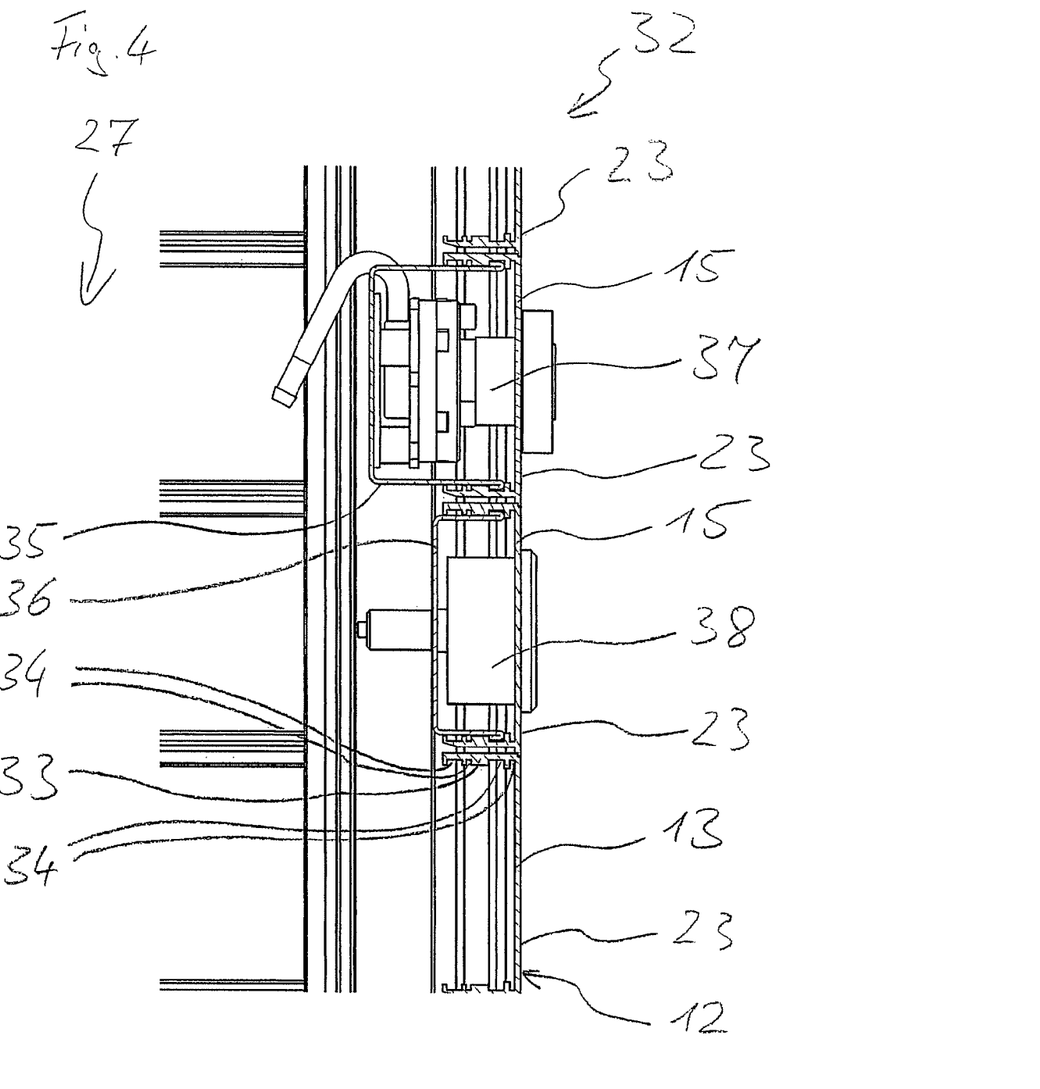
FIG. 4 shows a vertical section through a portion of the carrier.

In FIG. 4, a vertical section through a portion of the carrier 32 is shown. On the right-hand side of the illustration, the front faces 23 of the several built-in modules 13 forming a part of the longitudinal face 12 are illustrated. The built-in modules 13 have a rectangular recessed shoulder at the upper ends of the lateral contours starting from the front face 23. At the lower face of the front faces 23, the lateral contour of the built-in modules 13 is provided with a downward protrusion which is formed so as to be complementary to the shoulders at their upper side. This configuration results in an engagement of the shoulders and protrusions which prevents liquids descending the front face 23 from entering the carrier 32. The lower portion of the front face overlaps the shoulder at the upper end of the front face 23, thereby avoiding the creation of a gap extending through the inside between the built-in modules 13 so that the ingress of the liquids is prevented, even when variations within tolerances occur.

The strings forming the protruding elements 33 on the side opposite to the front face 23 are provided with multiple grooves 34 having different widths. The grooves 34 of the upper string 33 and the grooves 34 of the lower string 33 are oppositely arranged. In alternative embodiments, the number of the grooves may vary and the width of the grooves may be realized differently. The strings 33 with the grooves 34 serve as fasteners for attachments on the face opposite to the front face 23.

In the gas built-in modules 15 shown in FIG. 4, gas outlets 37 or pressure gauges 38 are respectively mounted. The gas outlets 37 or pressure gauges 38 are fixed at the gas built-in module 15 by means of attachments in the form of fastening members 35, 36. In particular, the fastening member 35, 36 comprises a U-shaped contour whereby the closed-end shank of the horizontal U is directed to the internal space 27 of the carrier 32. At both ends of the U-shaped contour, opposite to the closed-end region, the ends of the shanks are bent by 180°. Therewith, they form engagement elements on the outer face of the fastening members 35, 36. The dimensions of the fastening member 35 depend on the kind and the attachment options of the gas outlets and pressure gauges. The fastening members 35 may vary in depth, width, and in contour. Dependent on the gas outlet attachment, the fastening member can either be mounted in the orientation as shown in FIG. 4 or it can be mounted turned by 180° so that the closed-end region of the profile is on the right-hand side in FIG. 4. In an extreme case, the fastening member is reduced to a fastening plate. The engagement elements formed at the fastening members 35, 36 or the fastening plate are respectively inserted into the grooves 34 provided at different distances from the front face 23 as to be fasteners.

The attachment of the electrical outlets in the electrical built-in modules 14 basically takes place in the same way. Dependent on the kind and the attachment options of the electrical outlets and gas outlets or pressure gauges, a direct attachment to the front plate forming the front face 23 is possible.

The gas outlets and pressure gauges are connected with the central gas supply system by means of hoses or tubes (not shown). The electrical outlets are connected to the conductor rails 41 shown in FIG. 3 or they are, alternatively, directly wired with the public power supply.

The dimension of the built-in modules 13 in vertical direction, i.e. in its height, is chosen to be an integer multiple of the height dimensions for other built-in modules 13. Thus, single modules may easily be replaced or multiple modules may be replaced by one module having a bigger dimension wherein the front face 23 is not interrupted.

The replacement of modules in order to arrange the respective outlets close to the medical apparatuses so that the supply lines may be configured as short as possible, is easily possible, here. When the required configuration of the outlets is changed, a retrofitting of gas outlets, electrical outlets, or data interfaces is also easily possible without newly producing whole cover plates and without procuring big assembly efforts.

During the initial assembly, the resilient fastener elements 21 are clipped to the profile 28 by means of a device such that the resilient fastener elements 21 have a distance between one another and also from the upper cover plate 9 and from the lower cover plate 10 so that the built-in modules 13 can be clipped on according to their height dimensions. Thus, small gaps that may possibly occur, which emerge due to tolerances, are distributed across the entire front face 23 so that a bigger gap at one end of the front face 23 does not emerge.

What is claimed is:

1. A medical supply unit carrier of a medical supply unit system, the medical supply unit carrier comprising:
   at least three longitudinal members, each of the longitudinal members forming a longitudinal edge region of the medical supply unit carrier, wherein two of the longitudinal members cooperate to define an opening therebetween, the opening being sized and shaped to matingly receive a module having an outer surface that at least partially forms a longitudinal face of the medical supply unit system when the module is disposed within the opening; and
   two resilient fastener elements protruding from one of the two longitudinal members that cooperate to define the opening, wherein each of the fastener elements comprises a resilient portion to engage a projection of the module and releasably secure the module within the opening.

2. The medical supply unit carrier of claim 1, wherein the resilient fastener elements are separate elements which are connectable to the carrier.

3. The medical supply unit of claim 2, wherein the resilient fastener elements are made of spring steel.

4. The medical supply unit of claim 2, wherein the carrier and the resilient fastener elements are configured to form a positive connection.

5. The medical supply unit of claim 1, wherein the resilient fastener elements each comprise the resilient portion operable as a locking element and a non-resilient portion operable as a guide, which protrude towards a center of the opening.

6. A built-in module for insertion into a medical supply unit carrier having at least three longitudinal members that each form longitudinal edge regions of the medical supply unit carrier, the built-in module comprising:
   a body that is sized and shaped to be matingly disposed within an opening that is defined by and extends between two of the longitudinal members of the carrier, wherein an outer surface of the built-in module forms a part of a longitudinal face of a medical supply unit system comprised of the built-in module and the carrier when the built-in module is inserted into the opening defined by the two longitudinal members of the carrier; and
   two opposite projections adjacent to the outer surface, each of the projections being configured to engage a corresponding resilient fastener element protruding from one of the two longitudinal members to form a positive connection between the corresponding resilient fastener element and the built-in module when the built-in module is inserted into the opening defined by the two longitudinal members of the carrier.

7. The built-in module of claim 6, wherein each of the two opposite projections define a recess and comprise a locking face forming an angle smaller than 90° with respect to the outer surface of the built-in module.

8. The built-in module of claim 6, wherein the built-in module defines an aperture having a size and a position suitable to allow a tool to penetrate the aperture to release the engagement of the corresponding resilient fastener.

9. The built-in module of claim 6, further comprising attachment fasteners located opposite the outer surface.

10. The built-in module of claim 9, further comprising protruding elements, wherein the attachment fasteners are arranged at the protruding elements.

11. The built-in module of claim 10, wherein the protruding elements comprise fastening elements at different distances from the outer surface.

12. The built-in module of claim 9, wherein the attachment is a fastening member for gas outlets or electrical outlets.

13. The built-in module of claim 9, wherein the attachment is a fastening plate for gas outlets or electrical outlets.

14. A medical supply unit system comprising:
   a medical supply unit carrier comprising
      at least three longitudinal members, each of the longitudinal members forming a longitudinal edge region of the medical supply unit carrier, wherein two of the longitudinal members cooperate to define an opening therebetween, and
      two resilient fastener elements protruding from one of the two longitudinal members that cooperate to define the opening, wherein each of the fastener elements comprises a resilient portion; and
   a built-in module sized and shaped to be matingly disposed within the opening defined by the two longitudinal members of the carrier, the built-in module comprising:
      an outer surface that at least partially forms a longitudinal face of the medical supply unit system when the built-in module is inserted into the opening defined by the two longitudinal members of the carrier; and
      two projections adjacent to the outer surface, each projection being configured to engage the resilient portion of a corresponding one of the resilient fastener elements to form a positive connection between the corresponding resilient fastener element and the built-in module.

15. The system of claim 14, wherein the carrier defines an aperture having a size and a position suitable to allow a tool to penetrate the aperture to release the engagement of the corresponding resilient fastener element, the system further comprising a covering device configured to cover the aperture.

16. The system of claim 14, wherein the resilient fastener elements each comprise the resilient portion operable as a locking element and a non-resilient portion operable to guide the built-in module during insertion.

17. The system of claim 14, wherein each of the two opposite projections define a recess and comprise a locking face forming an angle smaller than 90° with the outer surface of the built-in module.

18. The system of claim 14, wherein the resilient fastener elements each comprise the resilient portion operable to engage a locking surface of a corresponding one of the two opposite projections, the locking surface forming an angle smaller than 90° with respect to the outer surface of the built-in module.

19. The system of claim 14, wherein the built-in module further comprises protruding elements extending away from the outer surface and having fastening elements positioned at different distances from the outer surface, the fastening elements configured to engage with a fastening member of an attachment.

20. The system of claim 19, wherein the attachment is a gas outlet or an electrical outlet.

* * * * *

UNITED STATES PATENT AND TRADEMARK OFFICE
CERTIFICATE OF CORRECTION

PATENT NO. : 8,376,302 B2
APPLICATION NO. : 12/775672
DATED : February 19, 2013
INVENTOR(S) : Georg Bauer et al.

Page 1 of 1

It is certified that error appears in the above-identified patent and that said Letters Patent is hereby corrected as shown below:

In the Claims:

Column 6, line 45 (Claim 3, line 45), delete "unit" and insert --unit carrier--.

Column 6, line 50 (Claim 5, line 50), delete "unit" and insert --unit carrier--.

Signed and Sealed this
Twenty-first Day of May, 2013

Teresa Stanek Rea
*Acting Director of the United States Patent and Trademark Office*